Oct. 30, 1962 HITOSHI KAJIHARA 3,061,754
TEMPERATURE COMPENSATING ELEMENT FOR A TRAVELING
WAVE TUBE PERIODIC ARRAY
Filed March 18, 1960 5 Sheets-Sheet 1

HITOSHI KAJIHARA
INVENTOR.

BY Andrew L. Bain
George B. Oujaro
ATTORNEYS

Oct. 30, 1962 HITOSHI KAJIHARA 3,061,754
TEMPERATURE COMPENSATING ELEMENT FOR A TRAVELING
WAVE TUBE PERIODIC ARRAY
Filed March 18, 1960 5 Sheets-Sheet 2

HITOSHI KAJIHARA
INVENTOR.

BY Andrew L. Bain
George B. Oujevolk

ATTORNEYS

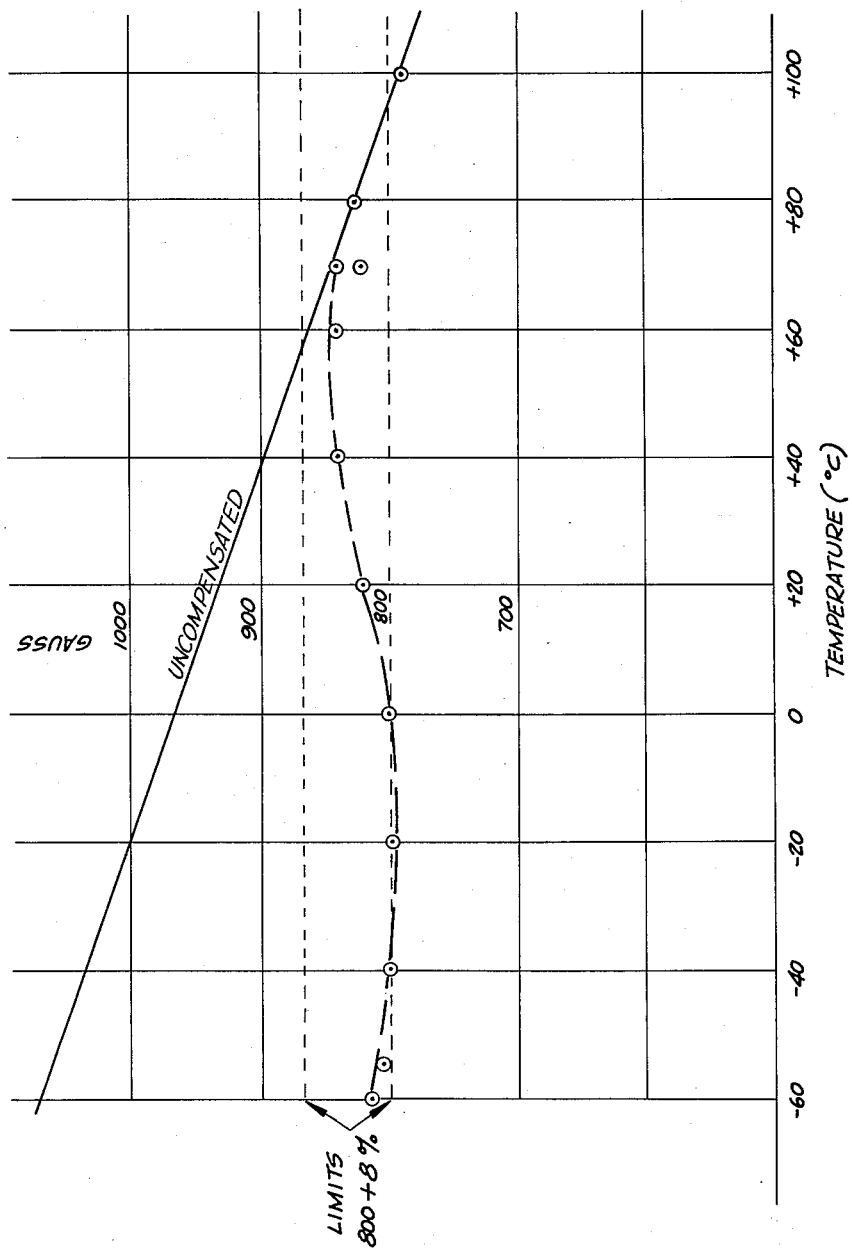

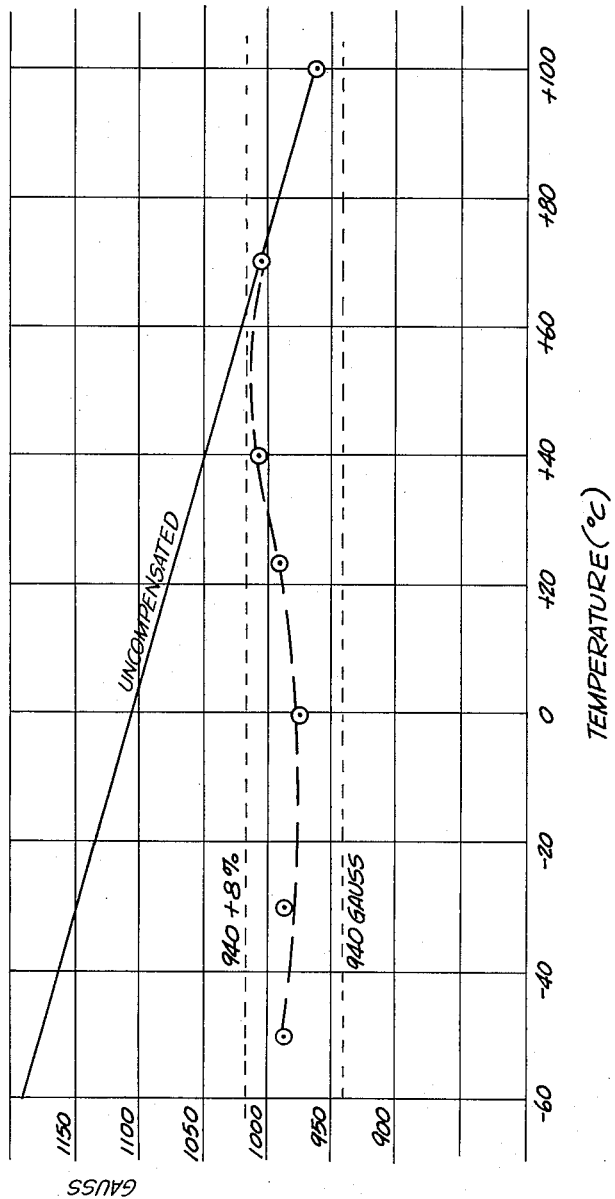
Fig. 9
HITOSHI KAJIHARA
INVENTOR.
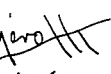
ATTORNEYS

United States Patent Office 3,061,754
Patented Oct. 30, 1962

3,061,754
TEMPERATURE COMPENSATING ELEMENT FOR A TRAVELING WAVE TUBE PERIODIC ARRAY
Hitoshi Kajihara, Coytesville, N.J., assignor to General Precision, Inc., Little Falls, N.J., a corporation of Delaware
Filed Mar. 18, 1960, Ser. No. 16,104
3 Claims. (Cl. 313—84)

The present invention relates to the magnetic structure associated with a traveling wave tube, and more particularly to the provision of temperature compensating means for use with such tubes.

A traveling wave tube, often referred to as a TWT, consists of a structure for producing an electron beam which traverses the tube; a transmission line often referred to as the slow wave structure which propagates a microwave signal in a manner permitting interaction between the electron beam and the signal; a collector for removing unused beam energy, transducers for introducing and removing this signal; and an attenuator which isolates the input and output sections of the slow wave structure to prevent oscillations. The structure for producing the electron beam is comprised of an electron source in the form of a cathode and one or more anodes or grids which control, guide and direct the electron beam. The slow wave structure may take the form of a helix or resonant cavities, or other means may be used to permit interaction between the beam and the signal.

The electron beam in the tube may be confined magnetically by employing a sinusoidally varying magnetic field. TWT's of this type, because of their field pattern are usually referred to as periodically focused traveling wave tubes. The magnetic structure itself is usually called a periodic TWT array or stack.

The introduction of periodic field focusing of low voltage electron beams was made by J. R. Pierce, "Spacially Alternating Magnetic Fields for Focusing Low Voltage Electron Beams," Journal of Applied Physics, volume 24, page 1247, 1953. Later Mendel, Quate, and Yocom published the results of their work "Electron Beam Focusing With Periodic Permanent Magnet Fields," Proceedings IRE, volume 42, page 800, 1954. Still later, the design of periodically focused TWT arrays or stacks was described by Kern, K. N. Chang, in an article entitled "Optimum Design of Periodic Magnetic Structures for Electron Beam Focusing," R.C.A. Review, volume 16, page 65, 1955. These articles as well as later patents and publications explain the disposition of the magnets as well as the means required to design the periodically varying magnetic structure. The described structures include a plurality of ring shaped magnets and pole pieces so disposed that adjacent poles of magnets are of the same polarity, i.e., north-south; adjacent south-north; adjacent north-south; etc. The axial field of the magnetic structure is made to coincide with the axis of the slow wave structure, i.e., the helix of the TWT. However, ferrite permanent magnets of the type used in periodic magnetic focusing arrays for TWT's exhibit a change in remanent induction with temperature. This property manifests itself in an array whose strength is temperature dependent, and, a TWT amplifier used with such an array or stack has a gain and power output which changes with temperature. In some instances the array strength may change sufficiently to reduce output power to zero. To obtain a TWT amplifier operating at peak performance over a range of temperatures, is therefore not possible with the stacks heretofore in use.

Although attempts were made to overcome the foregoing difficulties, so as to provide a stack not subject to changing magnetic characteristics because of temperature variations, none, as far as I am aware, was entirely successful when carried into practice commercially on an industrial scale.

Thus, it is an object of the present invention to provide a magnetic stack whose magnetic characteristics will not be affected by temperature changes between a range of about −65° C. to about +125° C.

Another object of the present invention is to provide such a stack without increasing the size and weight of the stack to any appreciable extent.

Still another object of the present invention is to provide such a stack without changing the geometry of the stack to any great extent.

With the foregoing and other objects in view, the in-invention resides in the novel arrangement and combination of parts and in the details of construction hereinafter described and claimed, it being understood that changes in the precise embodiment of the invention herein disclosed may be made within the scope of what is claimed without departing from the spirit of the invention.

The accompanying drawings, illustrative of one embodiment of the invention, and several modifications thereof, together with the description of their construction and the method of operation and utilization thereof, will serve to clarify further objects and advantages of my invention.

Other advantages will become apparent from the following description taken in conjunction with the accompanying drawing in which:

FIGURE 1 is a perspective exploded view of a portion of a periodic array having the compensating elements of the type depicted in FIGURE 6;

FIGURE 8 depicts in graphic form the results obtained with one of the foregoing types of compensating elements;

FIGURE 9 shows in graphic form the results obtained with another of the foregoing types of compensating elements;

Figure 1:
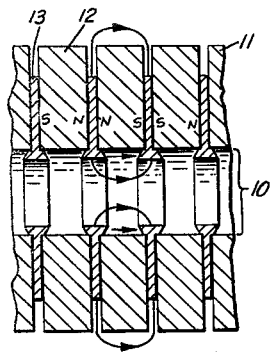
FIGURE 1 is a longitudinal cross-sectional view of a portion of a periodic array of the prior art showing the main flux paths of the array.
Figure 2:
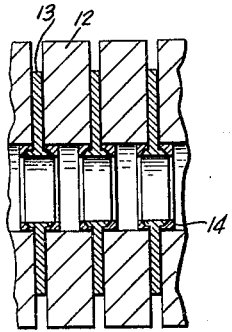
FIGURE 2 is a view similar to FIGURE 1 showing one type of temperature compensation element used with the periodic array.

In the drawing, there is first illustrated the principal fields of magnetic flux for an optimized temperature uncompensated array 11. For the purpose of this invention, an optimized array is one which yields a specified field strength of a given periodicity and array interior diameter with a minimum of array outer diameter. Attention is directed to the fact that for this array, the magnets 12 extend somewhat beyond the pole pieces 13 and the magnet interior diameter 10 is kept at a minimum. The array illustrated in FIG. 1, made of ferrite magnets exhibits a decrease in array strength with increasing temperature. Consequently, the lowest field occurs at the highest operating temperature.

The main flux paths of the periodic array structure are from one pole down to the cylindrical axis centerline and over to the other pole, which is termed herein as path I; across the inner rim of the ring shaped magnets from pole to pole parallel to the cylindrical axis which is termed herein as path II; and from pole to pole across the outer rim of the ring shaped pole pieces which is termed herein as path III. Since the electron beam in the TWT is acted on principally by path I, the objective of temperature compensation is to maintain the flux of path I constant. This can be achieved by varying the permanence of paths II and III appropriately with changing temperature. The permanence variation is obtained by inserting material whose permeability changes appropriately with temperature in paths II and III. An ideal compensator material is characterized by high saturation flux density and high permeability, the latter decreasing linearly with temperature. Its Curie temperature coincides with the highest array operating temperature.

For the purpose of the present invention, it has been found that an iron-nickel alloy having a nickel content of between about 28.50% to about 33.50% nickel with minor amounts of carbon, phosphorus, sulphur, silicon, manganese, would, from the metallurgical standpoint provide the required temperature compensation.

Typical such alloy compensators which were analyzed had the following contents:

COMPOSITION OF TEMPERATURE COMPENSATOR ALLOYS

| Carbon | 0.13 | 0.07 | 0.11 |
|---|---|---|---|
| Phosphorus | 0.013 | 0.012 | 0.013 |
| Sulphur | 0.021 | 0.024 | 0.012 |
| Silicon | 0.20 | 0.15 | 0.17 |
| Manganese | 0.66 | 0.56 | 0.69 |
| Nickel | 29.80 | 30.89 | 32.43 |
| Iron | Balance | Balance | Balance |

Generally speaking, the present invention contemplates providing an array or stack having a constant field strength over a wide temperature range, e.g., from about $-65°$ C. to about $+125°$ C. by having an array design of minimum size with the required field strength at the highest operating temperature and, in combination therewith compensator elements disposed across paths II and III or III to maintain constancy of field around the stack cylindrical axis with decreasing temperature.

According to one embodiment of the invention, there is provided a ring-like compensator 14 surrounding the cylindrical axis of the array. For convenience, this type of compensator is termed a type A compensator. Type A compensators permit the maintenance of the optimized pole piece to magnet dimensional relationship. It diverts the maximum amount of flux per unit cross sectional area. The magnitude of flux diverted from path I determines the cross sectional area required. However, the area which can be introduced is fixed by the magnets and pole piece interior diameters. Thus, type A compensator may comprise merely a flat disk-shaped ring, or a ring with some thickness, depending on the effect desired. As a flat disk-shaped ring, the compensator 14 is placed on both sides of the pole piece and lies flat between the pole piece and the adjacent magnet. Or, the type A compensator may take the form of a disk-shaped ring, i.e., there is a ring portion 14a and a flange portion 14b. The flange shaped portion is so disposed as to fit on the hub of the pole piece.

To maintain optimized array dimensional relationship, it is also possible to use a disk-ring compensator 15 which fits over the pole pieces in the array. In this case, a tight fit is required between the pole piece outer diameter 13a and the compensator inner diameter 15a. For convenience, this type of compensator is termed herein a type B compensator.

Figure 3:
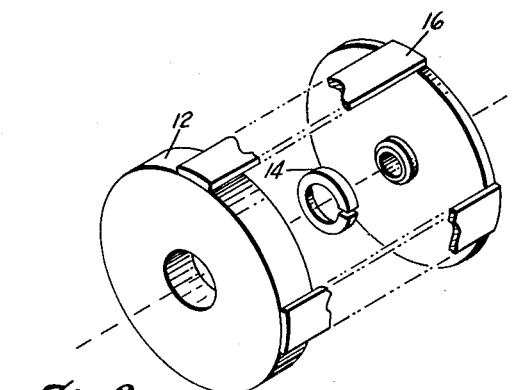
FIGURE 3 is a perspective exploded view of portions of a periodic array having the compensating elements of the type depicted in FIGURE 2; as well as other compensating elements.
Figure 3A:
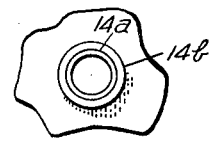
FIGURE 3A shows another embodiment of the compensating element shown in FIGURE 3.
Figure 4:
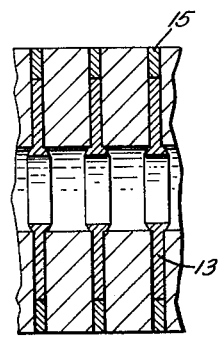
FIGURE 4 is a view similar to FIGURE 1, but showing another type of temperature compensation element used with the periodic array.
Figure 5:
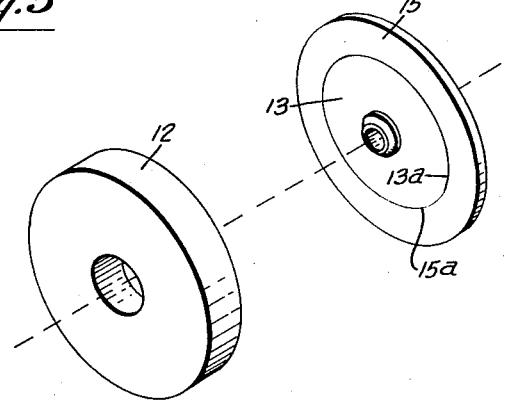
FIGURE 5 is a perspective exploded view of portion of a periodic array having the compensating elements of the type depicted in FIGURE 4.
Figure 6:
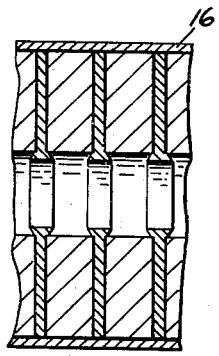
FIGURE 6 illustrates in a view similar to FIGURE 1, a third type of temperature compensating element used with a periodic array.
Figure 7:
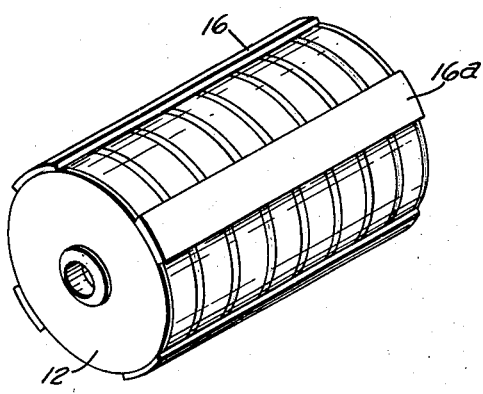
Figure 11:
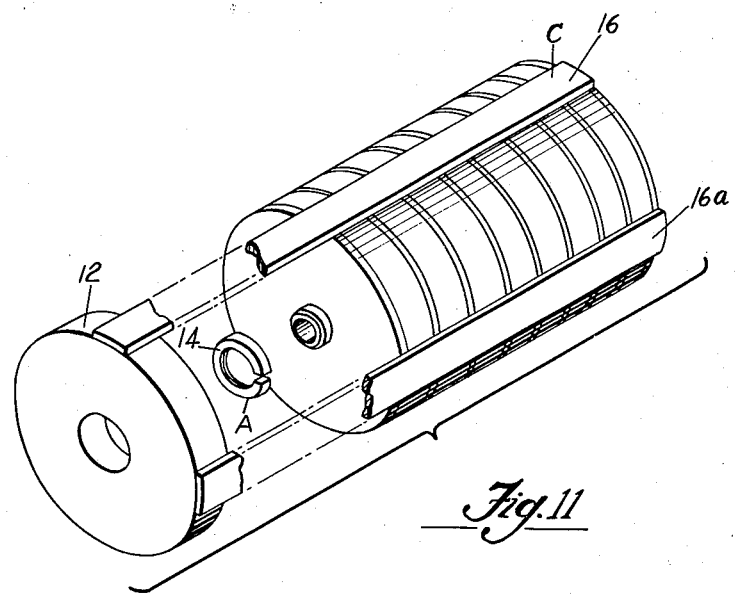

By far the simplest type of compensator can be formed by taking an elongated strip of the compensator alloy, curving it laterally so as to conform to the curvature of the stack, and disposing a plurality of such strips over the stack parallel to the stack cylindrical axis. This is depicted in FIGS. 3 and 7. Thus, there is shown a plurality of strips of compensating alloy 16 curved across their width 16a. The strips are preferably glued on, or they may be held together by a plurality of thin wires. The advantages of this particular embodiment are that in the laboratory, the stack magnetic field can be easily changed or adjusted with this type of compensating element. This type of compensator is termed herein a type C compensator. It can be used in conjunction with other types for flux trimming purposes or used totally by itself. In the latter case, it becomes necessary to extend the pole piece outer diameter to equal the magnet outer diameter. This is a deviation from the optimized array dimensional relationship resulting in a slightly larger array size. Type C compensator is the least expensive to fabricate and yields the most uniform reduction of individual peaks in the array field pattern. The compensator type and material chosen for an array is dictated by the aray characteristics and requirements including field strength, temperature, range, degree of compensation and size limitation. Other more sophisticated types of compensators yielding superior compensation are achieved by combining material as well as compensators.

The following illustrative example will serve to give those skilled in the art a better understanding of the invention.

Example I

The problem is to design a temperature compensated array to the following specifications:

$B_0 = 960 + 8\%$ gauss
(Period) $L = 0.460$ inch
Temperature range $= -55°$ C. to $+100°$ C.
Tube diameter $= 0.25$ inch
Array length $= 7.5$ inch
Array weight $= 1.5$ lbs. maximum First the field strength limits are calculated. This is 960 to 1037 gauss. Next the field at room temperature, 20° C. is calculated so that a field of 960 gauss will be maintained at the highest operating temperature. The rate of decrease varies with type of magnetic material used, but, with the particular material used in this case it was found to be 0.19% per degree centigrade. The calculation is thus as follows:

$B$ at max. temp. $= B$ at room temp. (1% decrease per degree C.)

$$B_{100°\text{ C.}} \text{ or } 960 = B_{20°\text{ C.}} \times [1 - [0.0019 \times (100-20)]]$$

$$B_{20°\text{ C.}} = \frac{960}{1 - 0.152} = 1130 \text{ gauss}$$

Thus, an array of $B_0 = 1130$ gauss at room temperature is designed. The compensation is then determined experimentally. It is found that one layer of 0.030″ thick 30 Ni 70 Fe compensator type C, i.e., strips, surrounding the periphery of the array decreases the field by 140 gauss at 20° C. The permeability versus temperature characteristics of this material is of course known beforehand and is available in either table or graph form. The array strength from $-55°$ C. to $+100°$ C. is then calculated so as to ascertain that the compensator at any temperature within the desired range will not cause a change in permeability beyond the desired range. The results can then be set down in either tabular or graph form. The following table gives the results of this example as well as the compensated actual array strength obtained by a temperature test.

TABLE 1

| Temperature, °C. | Uncompensated array strength | Percentage predetermined characteristics [1] | Magnitude of field decrease | Array strength | |
|---|---|---|---|---|---|
| | | | | Calculated | Actual |
| −60 | 1,302 | [1]2.33 | −327 | 995 | 1,030 |
| −40 | 1,259 | 2.17 | −302 | 957 | 1,000 |
| −20 | 1,216 | 1.83 | −256 | 960 | 975 |
| 0 | 1,173 | 1.5 | −210 | 963 | 965 |
| +20 | 1,130 | 1 | −140 | 990 | 990 |
| +40 | 1,087 | ½ | −70 | 1,017 | 1,030 |
| +60 | 1,044 | ⅙ | −23 | 1,021 | 1,015 |
| +70 | 1,023 | 1/30 | −5 | 1,018 | 1,000 |
| +80 | 1,001 | | −0 | 1,011 | 970 |
| +100 | 958 | | −0 | 958 | 950 |

[1] μ Vs. °C., μ 20 °C.=60–61.

Examples 2, 3, and 4

Figure 10:
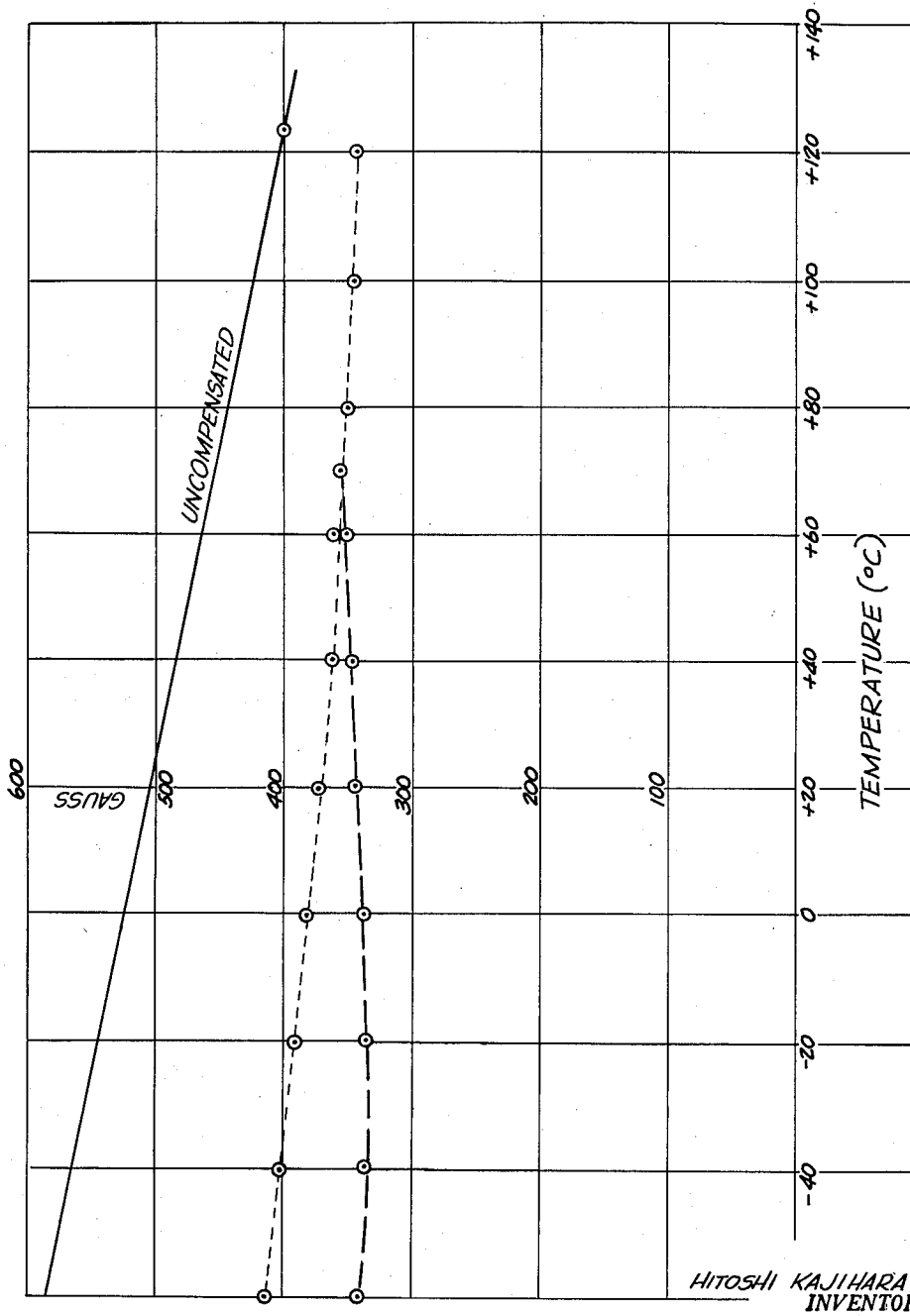
FIGURE 10 shows in graphic form the results obtained with still another variation of compensating elements; and, FIGURE 11 illustrates in a perspective view the construction of a magnetic stack which would produce the results depicted in graphic form in FIGURE 10.

The problem was to design stacks meeting certain requirements. The procedure described in Example 1 was followed. The results were plotted on graph paper and are depicted in FIGS. 8, 9, and 10. In all cases, the stack was brought within the limits shown by use of the compensators described.

TABLE 2

| Example No. | 2 | 3 | 4 |
|---|---|---|---|
| Temperature range, °C. | −40 to +100 | −40 to +100 | −40 to +120 |
| Array length, inches | 9.8 | 7.45 | 18.125 |
| Weight, lbs | 4.5 | 1.35 | 14.00 |
| Array O.D., inches | 1.75 | 1.065 | 2.5 |
| Period, inch | 0.400 | 0.460 | 0.816 |
| Field strength, gauss | 800 plus 8% | 940 plus 8% | 335 plus 20 gauss |
| Compensator, type | A | C | A and C |
| Material | 30 Ni | 30 Ni | A-32 Ni; C-30 Ni |
| Graph, FIG. No. | 8 | 9 | 10 |

In FIGS. 8 and 9, the solid line is the stack uncompensated; the dash line shows the effect of the compensators and the dotted lines show the desired limits. In FIG. 10, the solid line shows the stack uncompensated, the dotted line, type A material 32 Ni compensation, and the dash line types A, material 32 Ni, and C, material 30 Ni, compensation.

It is to be observed therefore that the present invention provides for a method of forming a TWT magnetic stack so that the magnetic field around the inner cylindrical axis of the stack is fairly uniform over a temperature range of from −65° C. to +125° C. comprising the steps of assembling a stack of the desired length, outer diameter and inner diameter of ring-like magnets of known strength and temperature characteristics, aligned with their poles north-south adjacent south-north adjacent north-south; interposing pole pieces between said magnets so that the total calculated field strength around the cylindrical axis according to the predetermined characteristics of the magnets will give the desired field strength at the maximum operating temperature; placing across one of the principal magnetic paths of the stack a compensator formed of a nickel-iron alloy having between about 28.5% to about 33.5% nickel and the balance substantially iron, of predetermined permeability varying characteristics in accordance with temperature, whose Curie point is about equal to said highest operating temperature, and of a size, shape and thickness compatible with the general geometry and symmetry of the stack; measuring the decrease in the magnetic field around the cylindrical axis of the stack at 20° C. using said one compensator; and adding sufficient compensators across the principal magnetic paths of the stack other than the path surrounding the stack cylindrical axis so as to decrease the field strength of the stack to the desired field strength at room temperature. Said compensators may be applied across the magnetic path extending across the inner rim of the ring-shaped pole pieces from pole to pole parallel to the cylindrical axis of the stack, across the outer rim of the ring-shaped pole pieces or across both the inner and outer rim of the ring-shaped pole pieces.

Furthermore, the present invention provides for an article of manufacture, namely a stack having a magnetic field around the inner cylindrical axis thereof of a fairly uniform field strength over a wide temperature range comprising in combination, a plurality of ring-shaped magnets of the same size and magnetic characteristics, cylindrically aligned; disk-shaped pole pieces interposed between each of said magnets and having a ring-like aperture substantially the size of the magnet ring aperture; and compensators made of a nickel-iron alloy having between about 28.5% to about 33.5% nickel and the balance substantially iron interposed across the principal magnetic paths of the stack other than the path surrounding the stack cylindrical axis. Said compensators may be ring shaped and have a flange, i.e., adapted to go on the hub of the pole piece in the stack as well as a disk adapted to lie between pole pieces just surrounding the cylindrical axial aperture of the stack; or, said compensator may be simply disk shaped with a central aperture substantially the size of the magnet ring, adapted to lie between pole pieces, and of a diameter substantially smaller than that of the pole pieces. If the compensator is interposed across path III of the flux paths, the compensators may be disk shaped and of a thickness equal to that of the pole pieces, the inner diameter of the compensator being adapted to engage tightly the other diameter of the pole pieces, or, the compensator may comprise a plurality of elongated flat strips placed e.g. glued across the outer rim of the stack parallel to the stack cylindrical axis and laterally curved to conform to the stack outer rim. In this case the pole piece and the magnet diameters are equal. Likewise, it is possible to combine two types of compensators e.g., there can be combined with the flat disk shaped compensators lying between the pole pieces a plurality of elongated flat strips placed across the outer rim of the stack parallel to the stack cylindrical axis, laterally curved to conform to the stack outer rim. Also all three types can be combined.

It is likewise to be observed that as used herein, the term "stack" has a special meaning and refers to the periodic array of a traveling wave tube, i.e., a plurality of aligned cylindrical magnets, pole pieces, etc., used to vary the TWT beam sinusoidally, and the term "element" is not used in the chemical sense but in the mechanical sense and as such has a meaning somewhat similar to the term "member."

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. In a cylindrical magnetic stack formed of a plurality of axially aligned ring-shaped magnets and pole pieces disposed so as to provide a periodically focused magnetic field of a desired field strength for a traveling wave tube to be axially disposed in said stack, the improvement therein, designed to maintain said periodically focused field strength constant over a wide temperature range, comprising, having said magnets and pole pieces of equal diameter, and, in combination with said stack, of temperature compensating means consisting of a plurality of elongated flat strips, laterally curved so as to conform to the curvature of said stack, axially disposed across the outer rim of said stack, said means being characterized in that they provide a path for the magnetic field thereacross of sufficient permeance to decrease the strength of the periodically focused magnetic field of said stack to the desired field strength at a temperature of about 20° C., also, the increase in reluctance of said means caused by a rise in temperature being so related to the decrease in strength of said stack periodically focused magnetic field on account of said same rise in temperature that said decrease is compensated because the increased reluctance of said means diverts some of the lines of force flowing thereacross at lower temperatures into the periodically focused magnetic field at higher temperatures.

2. A stack as claimed in claim 1, said temperature compensating means being an iron-nickel alloy having about 28.50% to about 33.50% nickel and the balance substantially iron.

3. A stack as claimed in claim 2, said means including a plurality of ring-like temperature compensating elements disposed in the inner cylindrical rim of each of said aligned magnets between said pole pieces.

References Cited in the file of this patent
UNITED STATES PATENTS

| | | |
|---|---|---|
| 1,440,879 | Lee et al. | Jan. 2, 1923 |
| 2,560,260 | Sturtevant et al. | July 10, 1951 |
| 2,651,105 | Neel | Sept. 8, 1953 |
| 2,668,944 | Schwyn et al. | Feb. 9, 1954 |
| 2,847,607 | Pierce | Aug. 12, 1958 |
| 2,867,745 | Pierce | Jan. 6, 1959 |
| 2,895,066 | Yasuda | July 14, 1959 |
| 2,906,929 | Wyckoff | Sept. 29, 1959 |
| 3,001,094 | Yasuda | Sept. 19, 1961 |